(12) United States Patent
Collins

(10) Patent No.: US 8,097,078 B2
(45) Date of Patent: Jan. 17, 2012

(54) BINDER FOR WHITEWARE CERAMIC MIXTURE AND METHOD OF USING SAME

(75) Inventor: Clayton Collins, Nashville, TN (US)

(73) Assignee: Unimin Corporation, New Canaan, CT (US)

( * ) Notice: Subject to any disclaimer, the term of this patent is extended or adjusted under 35 U.S.C. 154(b) by 642 days.

(21) Appl. No.: 12/254,848

(22) Filed: Oct. 21, 2008

(65) Prior Publication Data

US 2009/0156387 A1   Jun. 18, 2009

Related U.S. Application Data (60) Provisional application No. 61/007,464, filed on Dec. 13, 2007.

(51) Int. Cl.
*C08L 89/00* (2006.01)
*C08L 3/00* (2006.01)

(52) U.S. Cl. ............. 106/134.2; 106/134.1; 106/157.71; 106/160.1; 501/141; 501/143; 501/144

(58) Field of Classification Search .................. 501/141, 501/143, 144; 106/134.7, 160.1, 157.71, 106/134.1, 134.2
See application file for complete search history.

(56) References Cited

U.S. PATENT DOCUMENTS

| | | | |
|---|---|---|---|
| 5,372,976 A | | 12/1994 | Matsumoto et al. |
| 5,705,118 A | * | 1/1998 | Hayes et al. .................. 264/656 |
| 5,830,548 A | | 11/1998 | Andersen et al. |
| 6,420,292 B1 | | 7/2002 | Kumaoka |

OTHER PUBLICATIONS

International Search Report and Written Opinion for PCT/US08/86497, filed Dec. 12, 2008.
Article: *The Power of Proteins* by Christine L. Grahl, Jan. 2003, www.ceramicindustry.com.
Article: *What Are Protein Colloids?* by International Protein Colloids, Inc.
Article: *A New Generation of High Performance Protein Collagen Based Binders Has Evolved . . .* by International Protein Colloids Inc.

\* cited by examiner

*Primary Examiner* — David M Brunsman
(74) *Attorney, Agent, or Firm* — Rankin, Hill & Clark LLP (57) ABSTRACT

An improvement in a mixture for forming into a body that is to be fired into a "whiteware ceramic product" wherein the mixture is a compound of clay and other minerals with a ferric oxide content of less than about 5.0% by weight of the dry mixture. The improvement includes adding to the mixture a binder in the form of a combination of protein and a vegetable flour with an equivalent gram strength of at least 30 grams and a protein content of 20-50% of the binder, where the binder is in the range of 0.05% to 0.50% by weight of the dry mixture.

19 Claims, 4 Drawing Sheets

BINDER FOR WHITEWARE CERAMIC MIXTURE AND METHOD OF USING SAME

This application claims the benefit of provisional application 61/007,464 filed on Dec. 13, 2007. This previously filed provisional application is incorporated by reference herein as disclosure material and background information.

The invention relates to the art of producing fired whiteware products and more particularly to a binder for the fine grain ceramic mixture used to produce the pre-fired "green" body preparatory to making of a whiteware ceramic product, such as a ceramic tile. Furthermore, the invention involves the method of using the novel binder for producing the green body preparatory to production of the whiteware ceramic product.

INCORPORATION BY REFERENCE

In addition to the provisional application, a January 2003 article entitled The Power of Proteins is incorporated herein since the binder of the present invention is a protein polymer of the generic type heretofore used only for brick manufacturing, as described and explained in this article. This background information is also combined with an article entitled What are Protein Colloids? by International Protein Colloids, Inc. together with an article relating to "A New Generation of High Performance Protein Collagen Based Binders Has Evolved . . . ". These three articles constitute background information for the present invention and illustrate that collagen protein binders have been used in brick manufacturing, but not in the technology to which the present invention is directed.

WHITEWARE TECHNOLOGY

In the ceramic industry, there is a special species defined as whiteware which is a product fired, normally glazed but sometimes unglazed, from a starting mixture of fine grain light colored material. A whiteware product is a distinct classification and is distinguished by a low water absorption value ranging from less than about 0.5% for a fully vitreous product to about 15-20% for wall tiles and other earthenware bodies. Such low water absorption is due to the glass formation in the body during the firing of the green body into the final product which causes a minimum number of fine pores in the product itself. In order to achieve the distinguishing fine texture of whiteware, the starting materials used in the green body are typically ground to a particle size of less than about 100 microns in diameter. In order to achieve the white to buff fired color, the ferric oxide content of the body is controlled to a value generally no greater than 2.0% and in some cases less than 5.0%. Most whiteware products are made from a mixture of minerals consisting of clays and other fine grain minerals whether naturally occurring or synthetic. Consequently, the product technology to which the present invention is directed to a final product having a low moisture absorption of substantially less than about 20-25%. The starting mixture for producing the final product is formed into an intermediate "green" body. This fine grain mixture is a combination of clay and other minerals processed to have a particle size of less than about 100 microns. The ferric oxide content of the mixture is less than about 5.0% by weight of the combination or mixture. This well defined whiteware technology is quite distinct from other related technologies, such as the technology used to make bricks. Brick technology involves merely a shale or clay product, which is not combined with any substantial amount of other minerals, except as a grog. Consequently, it presents a completely different set of requirements relating to the type of binder, if any. Whiteware employs a starting mixture of diverse minerals and may require a binder. Such binder must be compatible with a combination of fine grain clay and other diverse minerals.

In the brick industry, the end product has a coarser texture with a greater number and larger pores. The large grain material used to produce structural bricks presents a different binding technology. Binders are used to produce modest structural strength of the large block-like pre-fired body. The starting moldable material for brick is essentially all clay and typically has particles with only a general particle size of less than 2,000 microns, but substantially over 100 microns. Thus, brick creates a distinct binding requirement which can be solved easily by any number of available binders. The ferric oxide content of the material forming a brick is generally in the range of 5-10% which is drastically different than ferric oxide in the mixture forming a whiteware product. Thus, the brick forming technology and the whiteware forming technology are distinct. A brick is a solid structural masonry unit formed of clay and/or shale which is formed into a large rectangular prism body. While it is plastic, this large body does not have substantial strength problems. It is then fired in a kiln. The whiteware technology and industry of the present invention is quite different. The whiteware is a glazed or unglazed ceramic body which is normally quite fragile and is formed from a fine textured mineral mixture. The fired, final product is normally classified as a tile, china, porcelain or earthen ware. The invention relates to the whiteware technology which involves distinct demand for a binder to strengthen the original starting mixture as it is formed into a green body for subsequent processing. In summary, a primary structural distinction between "whiteware ceramic products" of the present invention and brick technology is the smaller cross-sectional thickness of whiteware ceramic products and the need to move, decorate, glaze and otherwise handle and manipulate the fragile pre-fired body before it is subsequently fired. The binder must add substantially more strength for the pre-fired body to produce a whiteware ceramic product.

"Whiteware Ceramic Products" Defined

In terms of the claimed invention, the definition of "whiteware ceramic products" refers to ceramic products having moisture absorption after firing of less than 25%, and made with a mixture of mineral components including clay, preferably ball clay, combined with a substantial portion of at least two other minerals including, but not limited to, kaolin, feldspar, nepheline syenite, silica, and talc. In the final forming stages, the mixture has a fine texture with ferric oxide ($Fe_2O_3$) content of less than about 10% by weight. The claimed "whiteware ceramic product" has no portion with a cross-sectional wall thickness greater than about one inch.

BACKGROUND

The articles incorporated by reference herein and the material in the provisional application constitute background of the present invention which is a discovery and improvement in the whiteware industry. By using the invention, a superior "green" body is formed for subsequent firing into a final whiteware product. In this specific industry, the starting material is a mixture formed from clay and other minerals, such as nepheline syenite and silica sand. The mixture has a fine grain size. Consequently, the material formed into the pre-fired green body is a fine grain mixture, not merely a mono-phase of clay. To maintain the strength of the green body formed from such a combined mineral mixture, the mixture may include a binder which performs the function of joining and holding together the small diverse mineral particles forming the mixture until the product is fired. In the past, the binders have been primarily inorganic compounds and certain limited organic binders having distinct adherence properties. These binders were not protein polymers and had to be added in high amounts and, thus, increased the cost needed to perform the function of holding together the diverse, mineral particles forming the whiteware pre-fired body.

THE INVENTION

The present invention relates to the discovery that a protein binder and especially a collagen protein has tremendous advantages when applied to the starting mixture for a whiteware ceramic product and more particularly to the discovery that a particular collagen protein binder and alternatively a particular vegetable protein binder is or are ideal as a binder for whiteware production. The discovery of the invention is a unique binder having an equivalent gram strength of at least 30 grams and a protein content of 20-50% of the binder. These particular properties of the binder are obtained by the combination of protein and a vegetable flour. This combination is the major factor in causing the substantial advantages in the preparation of the mixture forming the green body preparatory to production of a whiteware ceramic product. The special collagen protein with corn flour is a type of material sold by International Protein Colloids under the trademark PRO-BOND 1550 (DRY) as described in detail in the attached specification sheet which is incorporated by reference herein. Thus, the discovery comprises the heretofore unknown use of a protein in whiteware production and specifically for whiteware ceramic products. From this initial discovery, the invention further involves the primary discovery of a particular or special type of protein with property distinctions from all the many such organic materials. This two step discovery process resulted in an invention that constitutes a substantial advance in whiteware technology and, more particularly, in the manner of preparing the green body subsequently fired into the desired whiteware ceramic product. The mixture of the body costs less by a lower material requirement and by lesser processing energy. The invention preferably uses a collagen protein and corn flour as used in PRO-BOND 1550; however, a subsequent discovery involved a similar binder with a combined protein and vegetable flour. This binder has generally equivalent properties and results in essentially the advantage of the collagen protein and corn flour in PRO-BOND 1550. In this alternative the protein is a vegetable protein and the vegetable four is a starch. This binder is the PRO-BOND 1553 type described in the specification sheet incorporated by reference herein as disclosure. Hereafter, the description is directed primarily to use of the collagen protein, but the equivalent vegetable protein is essentially equivalent. The invention is use of a protein and vegetable flour having properties of overlapping in PRO-BOND 1550 and its equivalent PRO-BOND 1553.

Consequently, one aspect of the invention is an improvement in a mixture for forming into a body that is to be fired into a whiteware ceramic product. The whiteware product has a moisture absorption of less than 20-25% and the mixture is a combination of clay and other minerals processed to have a particle size of less than about 100 microns and with a ferric oxide content of less than about 5.0% to a lower level of less than about 2.0% by weight of the green body formed by the mineral mixture. The improvement includes adding to the mixture an appropriate amount of a binder in the form of a combination of a protein, such as collagen protein, and vegetable flour but preferably corn flour. This special organic material has an equivalent gram strength of at least 30 grams and a protein content of 20-50% of the binder. This binder has a particle size of less than about 20 mesh, and preferably in the range of 20-200 mesh, that is introduced into the mixture having diverse mineral particles and processed to have a size less than about 100 microns.

In another aspect of the invention, the binder is about at least 0.05% of the total dry weight of the mixture and preferably in the general range of about at least 0.05% to 0.50% of the dry weight of the mineral mixture. In the preferred implementation, the binder is loaded in the range of 0.10 to 0.20% of the dry weight of the mixture.

In yet another aspect of the present invention, the mixture to which the binder is added includes 0-30% by weight of silica sand and also nepheline syenite and/or feldspar powder wherein the powder and the sand have a particle size generally less than about 100 microns.

By yet a further aspect of the invention, the binder has an equivalent gram strength in the general range of 30-80 grams. Furthermore, another aspect involves the limiting of the ferric oxide content of the mixture to less than 5.0% by weight of the mixture to maintain an acceptable color for the whiteware ceramic product. A secondary limit of ferric oxide would be less than about 2.0% by weight of the dry mixture.

Another aspect of the invention is the increase of the modulus of rupture (MOR) of the mixture before it is fired up to about 10-50% over the same mixture without any binder. Indeed, tests have shown an increase in the modulus of rupture of the mixture is in the range of 15-35% over the same mixture without a binder. Furthermore, the binder of the present invention even increased MOR of the green body 4-15% over other collagen protein binders. Still a further aspect of the invention is providing the binder, as defined above, having carbon content of the binder is less than about 0.2% by weight of the total mixture.

The invention is also directed to the modification of a naturally occurring clay combined with other minerals to make whiteware. The clay includes a binder in the form of a combined protein, preferably collagen protein, and vegetable flour, preferably corn flour. The binder is added to the clay in amount to provide 0.10 to 0.20% by weight of binder in the final mixture on a dry basis. The broadest loading is 0.05 to 0.50 percent by dry weight. Thus, this aspect of the invention is a clay with a binder, which binder is a combined collagen protein and corn flour. Such binder for clay to be used in whiteware ceramic products has been discovered to be a superior binder for use in such clay, when it is combined with other fine grain minerals. This particular binder is Pro-Bond 1550 (DRY) obtained from International Protein Colloids and the generally equivalent Pro-Bond 1553 having vegetable protein with starch.

Still a further aspect of the invention is the provision of a method for producing a mixture for making a "green" body to be fired into a whiteware ceramic product. This method involves combining clay with at least one other mineral, adding to the mineral combination a protein binder in an amount of at least about 0.05% and then mixing the mineral combination and the binder by a mechanical mixer, such as a ball mill. This method produces a binder that increases the modulus of rupture by about 10-50% over a mixture with no binder and over 4% over a mixture using other collagen proteins as a binder, which binder concept in itself is novel in the whiteware industry. In accordance with a further aspect of this definition of the invention, the binder is added to the clay before the mixing operation and the binder and clay are mixed before the mixing operation.

Other aspects of the invention are defined in the appended claims of this disclosure, which original claims are incorporated by reference herein and relate to inorganic particles having a particle size of less than about 100 microns encapsulated and surrounded by organic polymer material in the form of the unique binder defined in the appended claims. Furthermore, there is a discovery that the unique selected binder of the present invention provides substantial advantages and is acceptable for use in a combination of several minerals as required for a whiteware ceramic product. The novel binder was discovered to impart substantial strength to the very fine particles of diverse minerals. Such strength is related to the ability to disperse through the mass of fine particles and interact with the high surface area of such diverse minerals. This is distinguished from selection of a binder for brick-type or shale clays which has the primary objective of plasticity and lubricity. The particles of minerals used to make bricks are generally larger and present a lower challenge in reacting to the substantial surface area of very small particles. Strength of green bodies with smaller cross-sectional dimensions is the major concern for a binder in the whiteware industry and this property is exceedingly accomplished by discovery of the novel collagen protein binder of the present invention.

The primary object of the present invention is the discovery of a novel binder for use in the mixture of fine grain minerals used to make a whiteware ceramic product.

Another object of the present invention is the provision of a binder, as defined above, which binder is formed from protein and a vegetable flour, such as corn flour. After extensive technical activity, at substantial costs, the unique binder of the invention has been discovered to be extremely beneficial in whiteware; especially for whiteware ceramic products. This is apparently because it has an equivalent gram strength of at least 30 grams and a protein content of 20-50% of the binder. The unique, novel binder is processed to have a particle size of less than about 20 mesh. Merely, the discovery of the use of a protein, such as collagen or vegetable proteins, for whiteware is novel. This allows low cost because of small loading requirements and less process energy. The discovery of the particular and special collagen protein of the invention allows realization of the highly advantageous properties of collagen protein binders for a mixture of fine grain minerals including clay together with the increase strength obtained by such binder. A binder in the form of collagen protein and corn flour enhances the advantage generic collagen protein binders enjoy over other organic binders. In summary, the mixture of clay and other minerals contains particles coated with a unique organic material.

Still a further object of the present invention is the provision of a binder for use for whiteware and particularly whiteware ceramic products, which binder produces substantial advantages in the processing of the mixture, as well as advantages in the green body formed preparatory to the firing of the body into a whiteware ceramic product. The invention produces a modulus of rupture of 10-20% increase at low levels and up to 18-35% of higher levels. This is at least a 4-15% increase over other collagen protein binders, even though such binders have not heretofore been used in whiteware production. In other words, the object of the invention is the provision of a collagen protein binder which has drastically improved modulus of rupture over other collagen protein binders, even though such binders do not constitute prior art. The increase of the modulus of rupture is advantageous for handling of the green body. Furthermore, the use of the collagen protein binder is highly beneficial in the processing of the mixture itself when compared to other binders. The body has an increased breaking strength. This is substantially advantageous for tiles and other whiteware ceramic products during handling, decorating and glazing. These processes can be performed with a substantial reduction in breakage of the green body. The unique collagen protein binder also increases the casting rate up to 2-6% over other collagen protein binders, even though such binders are not prior art, nor are they even publically known background information. The use of an organic binder in the form of a specific collagen protein or vegetable protein binder is a discovery and constitutes the present invention. This unique collagen binder increases the strength of the green body and the workability of the mixture for producing the green body.

Another object and advantage of the present invention is that the collagen protein binder or the equivalent vegetable protein binder decreases processing energy for extrusion by increasing flowability and plasticity of the mixture. These advantages of the novel binder, combined with the lower waste percentage when using the binder drastically increases the quality of the green body to be fired while lowering binder cost and decreasing the energy necessary for processing. This is a substantial cost advantage in addition to the quality advantage, which are primary attributes of the present invention.

In summary, the objects and advantages of the newly discovered protein binder is that (a) the binder itself is a collagen based protein polymer or vegetable based equivalent protein polymer and (b) the particular polymer developed for the binder has unique characteristics to produce the advantages set forth herein.

These advantages of the present invention together with other objects and advantages will become apparent from the following description, taken together with the accompanying drawings.

BRIEF DESCRIPTION OF DRAWINGS

FIG. 3A is a block diagram showing an alternative method to the method illustrated in FIG. 3; and, FIG. 4 is a bar graph displaying the modulus of rupture for a body using the preferred embodiment of the present invention as compared to a body using other versions of collagen protein binders.

PREFERRED EMBODIMENT

As previously discussed, the invention is directed to a discovery of a unique novel binder for the combined mineral mixture used in producing whiteware products and particularly whiteware ceramic products. The preferred implementation of the present invention is the making of ceramic tile bodies that are compressed to be generally rigid for subsequent firing into the whiteware ceramic product. In such pressed ceramic tile bodies, the addition of the novel collagen protein binder into either the clay portion of the mixture or to the mixture itself increases the breaking strength of the green body. This breaking strength is expressed as the modulus of rupture (MOR). By using the novel binder of the present invention, the modulus of rupture is increased by about 10-50% versus a controlled body utilizing no binder. Consequently, the use of a binder in the mixture for producing the whiteware ceramic product increases the dry breaking strength of the body. This is important in many shapes for whiteware ceramic products that are quite fragile until fired.

The binder used in the prior art production of whiteware were generally inorganic and required a substantial proportion of binder to produce an acceptable strengthened body. Such binder required high amounts and would drastically increase the energy necessary for producing the mixture and processing the mixture into the green body. It was determined that the collagen protein binders reduced the energy necessary for processing and also, indeed, increased the strength of the body, although not necessarily to the extent that was accomplished in the prior art using higher quantities of inorganic binder. Thus, it was found that the novel binders hereinafter, for simplicity, referred to as the preferred collagen protein binders, which have not heretofore been used for whiteware products, were advantageous for production of whiteware ceramic products to increase the modulus of rupture, while still decreasing the amount of binder necessary and the amount of energy required for producing the green body. The starting point of the present invention is the discovery of the advantages of using collagen protein binders in whiteware products, which is a novel concept. The further discovery of the special collagen protein binder of the present invention combined and drastically enhanced the advantages so far explained for production of whiteware ceramic products. This binder is a dry collagen protein modified by corn flour with a particle size of 20-150 mesh. It has a 10-15% moisture content and the pH in a 10% solution is 5.0-7.0. The two important characteristics of the novel organic binder is that the binder has an equivalent gram strength of 30-80 grams and a protein content of 30-50% in the preferred collagen embodiment and 20-50% in the equivalent vegetable protein embodiment. In the samples of the protein binder used in the preferred implementation of the invention, the moisture content was 12.5%, the pH was 6.1 and the equivalent gram strength was 65 grams. With this particle size, 97% of the binder pass through a 20 mesh screen. The special, discovered collagen protein of the present invention includes a corn flour and is now marketed by International Protein Colloids. The equivalent binder is a vegetable protein combined with a starch as recently developed by IPC.

When using the unique binder mentioned above in a tile formulation, the binder is loaded at about 0.1% as a dry weight percentage of the total weight of the mineral mixture including clay, nepheline and silica. This new binder increased the modulus of rupture by 18-25% at the 0.1% level over the MOR of a previous body. This strength increase was found to be extremely important in allowing the tile to be transported, decorated and glazed prior to firing without breaking or chipping the edges. Thus, the particular binder of the invention increased the percentage yield of acceptable pieces in the whiteware manufacturing process. The use of the novel binder required a surprisingly low level to realize the substantial strength increase. This was a critical consideration in ceramic tile applications. By adding a very low amount of the novel binder, the strength of the green body forming the relatively fragile tile to be fired was increased so that the modulus of rupture was at least 4-15% higher than other collagen proteins. Indeed, the increase was generally over 10% higher than other collagen protein binders. The lower amount of binder with the strikingly high strength is one of the surprising advantages of the present invention resulting in lower costs compared to previously used binders.

The relatively low amount of a novel binder needed to realize the strength increase necessary for the green body is a critical consideration in the whiteware industry, and especially in the whiteware ceramic product segment of this industry, such as production of ceramic tiles. Since ceramic tiles are fired in very rapid cycles, typically less than 45 minutes and sometimes as fast as about 30 minutes, it is important that the organic components be kept to a minimum to prevent a defect called "black core." This defect is caused by a residual, unoxidized carbon from the organic material in the body. It was found that the present invention produced the desired increased strength at low amounts of binder and had a low organic or carbon content. When making a whiteware ceramic product, such as ceramic sanitary ware, the use of a collagen protein binder was a new discovery. More importantly, the special collagen protein binder of the present invention was compared to other collagen protein binders at a 0.1% loading factor. This was a dry weight percentage for the total mixture including ball clay, kaolin, feldspar and silica. In this particular instance, the novel binder of the present invention increased the modulus of rupture by about 4 to 15% compared to other collagen protein binders. Such increase in modulus of rupture in the production of sanitary ware products is very important during handling and glazing of the large pieces, to reduce breakage prior to the pieces being fired. Thus, when making this particular type of whiteware ceramic product, the use of a very small amount of the novel collagen protein and vegetable flour binder drastically increased the strength of the green body as it is transported for firing into a final vitrified ceramic product.

The use of the novel collagen protein binder having a small amount of corn flour also substantially increased the casting rate of bodies preparatory to being fired. This feature of the present invention indicates the rate that the cast layer is built up along the slip-mold interface over time. The faster casting rate obtained by use of the present invention increases the productivity of the whiteware factory or plant. It has been found that the use of the novel binder has 13% increase over a body with no binder and a 2-6% increase over the casting rate of other collagen proteins by using the Baroid pressure casting test. In summary, the use of the novel binder of the present invention at low loading values drastically increased the strength or modulus of rupture and the casting rate over bodies using other collagen protein binders. The novel concept is the use of a protein binder with a vegetable flour and more importantly to the specific binder constituting the primary discovery of the present invention, i.e., collagen protein with a corn flour or its equivalent, vegetable protein with a starch.

It has been found that similar strength increases of other ceramic products using the novel binder of the present invention have been realized even with the various forming methods, such as dinnerware products formed by a roller or jiggering machine or electrical insulators formed by extrusion. The characteristics of the novel binder make the specific protein quite unique. In particular, the enhanced results of the new binder relate to the protein content and the equivalent gram strength of the collagen protein binder. The equivalent gram strength is determined by the molecular weight of the proteins and is a key distinction of the present invention. The equivalent gram strength is in the general range of at least 30 grams and generally in the range of about 30-80 grams. A mixture using the present invention can be used in a variety of methods as previously mentioned. For instance, the product can be pressed, cast, roller formed, jiggered, extruded, etc. All these processes have been found to not affect the advantages associated with the discovery that constitutes the present invention.

The novel collagen protein of the present invention can be used with the loading factor of greater than 0.05%, but preferably about 0.10 to 0.20% by dry weight of the total ceramic body. Indeed, it has been found that the loading can be in the range of 0.05 to 0.50% of the mixture by dry weight. When relating to the percentage of the clay portion of the ceramic mixture, the range for the loading factor is generally in the area of 0.10 to 2.0%. If the clay in the total mixture is reduced to about 10%, the binder in the clay is proportionally greater. The end result in the mixture of the body is at least 0.05% by dry weight of the body. The mixture using the present invention and the preferred implementation includes feldspar, as well as nepheline syenite with silica. Nepheline syenite is actually a naturally occurring mix of minerals that includes different types of feldspar. In the final mineral mixture, the particle size is less than 100 microns; however, it may be somewhat increased over that in some ceramic products. The percentage weight of silica is in the range of 0-30% by weight of the total mixture. All of these advantages and uses anticipated by the present invention are obtained by collagen protein, such as the type sold as Pro-Bond 1550 or 1553, which are the preferred binder implementation of the present invention.

EXAMPLES

Several tests were conducted on examples of mixtures for producing a green body of whiteware material. These examples involved the use of the unique collagen protein binders in the mixture for whiteware ceramic products. In summary, the following results were recorded. The first sample was a body using a moderate-to-high strength clay (Premiere AT from Troup, Tex.). The collagen protein binder of the present invention yielded a 35% increase in MOR at 0.1% loading and a 45% increase in MOR at 0.2% loading.

In the second example, a body using a low strength clay (Premiere ML from Gleason, Tenn.) using the novel collagen protein binder yielded a 45% increase in MOR at 0.1% loading and a 70% increase in MOR at 0.2% loading.

In a third example, a tile body modeled after Dal-Tile's Monterrey formula showed that the novel binder of the present invention can equal or exceed the strength of using Mississippi clay.

The strength effect obtained in the method were irrespective of addition procedure. Similar values were obtained whether the novel binder was pre-dispersed in the batch water for the mixture or blended dry into the clay. The total carbon level increases in proportion to the amount of novel binder use. The overall level were substantially lower than that of a ceramic body with high carbon clay. These three examples were produced and tested using the novel binder of a collagen protein with a corn flour. They all were used for making a base tile body including 40% shredded ball clay (AT from Troup), 50% nepheline syenite (A-30) and 10% silica sand. This mixture was processed by using 500 grams dry weight for each batch. The solids target for milling was 66%. In the milling machine the deflocculant was added at a level of about 5 grams. The deflocculant was TC 9010. A ball mill was used to mix the batch for 30 minutes. The slip passed through a 80 mesh screen and was checked for viscosity. The slip was allowed to dry overnight at 105° C. The next day, the mixture was milled for 4 minutes into a powder which passed through a grading screen of 20 mesh. Thereafter, 6% moisture was added for pressing the mixture into the desired shape. For each example, five pressed bars were formed at 6200 pounds for testing the pressed MOR. Three pressed disks were formed at 14,500 pounds for shrinkage. The disks were fired to 1180° C. in 60 minutes with a 5 minute soak time. The fired disks of the three examples were checked for fired shrinkage, water absorption and fired color of the disks. These disks had the properties so far disclosed, with respect to the novel binder of the present invention.

Other Tests

This same process was used for other collagen proteins to illustrate the difference between the present invention and a generic collagen protein binder which was still a novel concept with respect to whiteware ceramic products. These additional tests resulted in several conclusions regarding the advantage of using the present invention.

To show the advantage of the present invention over a generic collagen protein binder, four different grades of collagen protein binders were processed and tested for a tile body consisting of 30% Premiere AT ball clay, 50% Spectrum A-30 nepheline syenite, and 10% silica sand. The four collagen protein binders were each tested at 0.1% loading in the mixture, on a dry weight basis. The binder was added to the batch water before milling and forming of the bodies. Samples were prepared and tested for dry MOR and firing behavior. The following table shows the compositions and the results of these tests:

TABLE 1

|  | Control | Pro-Bond 1550 | Pro-Bond 100 | Pro-Bond 5085 | Pro-Bond 1141 |
|---|---|---|---|---|---|
| Dry MOR (psi) | 277 | 382 | 309 | 320 | 283 |
| % Fired Shrinkage | 8.6 | 8.6 | 9.2 | 9.0 | 9.0 |
| % LOI | 4.0 | 4.1 | 4.1 | 4.1 | 4.2 |
| % Water Absorption | 0.2 | 0.1 | 0.1 | 0.1 | 0.3 |
| Fired Color |  |  |  |  |  |
| L | 71.9 | 70.0 | 73.3 | 70.6 | 73.1 |
| a | 1.8 | 1.8 | 1.9 | 1.8 | 1.9 |
| b | 12.0 | 11.4 | 12.5 | 11.9 | 12.6 |

The comparison data reported in Table 1 illustrates the advantage of the binder used for the present invention, which is identified as Pro-Bond 1550. After these tests were conducted and analyzed, the substantial advantage of using the present invention over other generic collagen binders was documented. The new concept of using a collagen protein binder for whiteware ceramic products resulted in lower loading and energy requirements. These advantages were magnified by the physical characteristics of the present invention. Thus, the discovery of a collagen protein binder having the unique characteristics as defined in the claims of this application was made after substantial research time and cost.

The preferred collagen protein of the present invention provided the greatest strength increase. This made the invention a substantial improvement in the whiteware industry. In addition, the further advantages of using this novel binder were determined. The same base tile body was produced using the loading level of 0.1% and 0.2% by dry weight of binder. The binder was also analyzed with respect to the advantage of either adding the binder to the batch water as in Table 1 or blending the binder with the shredded clay before the clay was added to the mixing mill. The results of this analysis are set forth in Table 2.

TABLE 2

|  | Control | 0.1% in H2O | 0.2% in H2O | 0.1% in Clay | 0.2% in Clay |
|---|---|---|---|---|---|
| Dry MOR (psi) | 294 | 397 | 452 | 426 | 420 |
| % Fired Shrinkage | 8.6 | 8.8 | 8.6 | 8.7 | 8.9 |
| % LOI | 4.0 | 4.2 | 4.1 | 4.1 | 4.2 |
| % Water Absorption | 0.2 | 0.3 | 0.4 | 0.2 | 0.2 |
| Fired Color |  |  |  |  |  |
| L | 72.6 | 73.0 | 73.6 | 69.5 | 72.9 |
| a | 1.9 | 2.0 | 2.0 | 2.0 | 1.9 |
| b | 12.4 | 12.5 | 12.9 | 11.4 | 12.5 |

As set forth in Table 2, low loading amounts of 0.1% and 0.2% of binder by dry weight, both resulted in substantial increases in the MOR. When adding the binder to the batch water for the total mixture, higher loading factor increased the MOR. However, when adding the binder to the clay also increased the MOR by a similar amount as when added to batch water. However, both processes showed drastic improvements over the strength of other collagen protein binders. Consequently, the manner of introducing the binder is a process specific determination. A low amount of loading (about 0.10%) drastically increases the strength and integrity of the green body being produced. This test sample was similar to the first example reported above.

The test results in Table 1 and Table 2 employed a moderate-to-high strength clay for the green body. The clay was Premiere AT from Troup. For the next phase of the testing procedure, a sample like the second example was tested A weaker clay such as Premiere ML from Gleason was used to make a sample for determining if the novel binder could cause the clay to be strong enough merely by use of the unique binder. The base body was the same as the base body reported in Table 1 and Table 2. The mixture included 30% clay, 50% A-30 and 10% silica sand. In this particular evaluation of properties, the novel binder was loaded at 0.1% and 0.2% and the procedure used in the process result for Table 2 was also employed. The fired properties of the body were determined and reported below:

TABLE 3

|  | Control | 0.1% in H2O | 0.2% in H2O | 0.1% in Clay | 0.2% in Clay |
|---|---|---|---|---|---|
| Dry MOR (psi) | 133 | 194 | 224 | 198 | 235 |
| % Total Carbon | 0.08 | 0.13 | 0.16 | 0.13 | 0.17 |

The total carbon increased proportionally with the amount of loading for the novel collagen protein binder. The percentage strength increase was greater with the weaker ML clay than with the stronger AT clay of Table 2. By loading to the level of 0.2% binder in the mixture, the strength of the ML clay body approached that of the AT clay body. This data is reported in Table 3 to exhibit the increased strength of the body and the percentage of carbon in the mixture. The percentage is controlled to be less than about 0.2% by controlling the level of binder.

After the test samples generating the data of Tables 1, 2 and 3, a tile body based upon one used by Dal-Tile at their Monterrey plant was tested against the using of the novel collagen protein binder. The test body was used to evaluate the novel binder and is reported in Table 4 below:

TABLE 4

|  | Control | Test with 0.2% 1550 |
|---|---|---|
| Dry MOR (psi) | 330 | 396 |
| % Total Carbon | 0.08 | 0.15 |

The sample that created the data set forth in Table 4 was 24% Premiere AT, 26% sandy Lee A, and 50% A-30 with an addition of 0.2% of the novel collagen protein binder of the present invention. As can be seen, the novel binder did indeed increase the strength of the test body as is the characteristic of the present invention. It did however increase the carbon content which affects the black coring in the ceramic whiteware technology. Thus, the amount of binder including the mixture is controlled to assure that the carbon content of the final product is less than about 0.2%.

All of these tests on Examples and subsequent samples resulted in the summary of examples set forth in the introductory portion of the "Example" section. In summary, the following conclusions have been developed during the research and development leading to discovery of the use of the special collagen protein binder for whiteware ceramic products.

The novel collagen protein binder has greater impact on pressed MOR than other collagen protein binders. With AT clays, 0.1% of the novel binder produces 35-40% increase in MOR. A loading of 0.2% of the novel binder produces a 40-50% increase in the MOR. When using a weaker clay, such as ML-1, the increase in strength is even greater. A loading of 0.1% of the novel binder produces 45-50% increase in MOR. When the loading is increased to 0.2%, the MOR is increased by 67-75%. However, the undesired carbon increased proportionally to the loading of the novel binder into the ceramic creating mixture. Consequently, the lower level of loading is about 0.10% of the mixture. The upper limit has been found to be about 0.2% binder, which also has the advantage of not unduly increasing carbon.

These examples and samples producing the test results also establish that the binder of the present invention (a) is a substantial improvement over other collagen protein binders and (b) allows the whiteware industry to capitalize upon the lower cost and higher efficiency of organic binders. These advantages are obtained with a desired increase in strength and a carbon content within acceptable limits based upon the loading of the novel binder into the ceramic mixture. These examples were duplicated with the alternative binder of vegetable protein with starch.

DESCRIPTION OF FIGURES

Referring now to the drawings which are merely presented to reflect aspects and procedures for using the novel binder in a ceramic mixture. These figures are cumulative with respect to the disclosure of the invention and are of assistance in explaining certain attributes of the invention.

Figure 1:
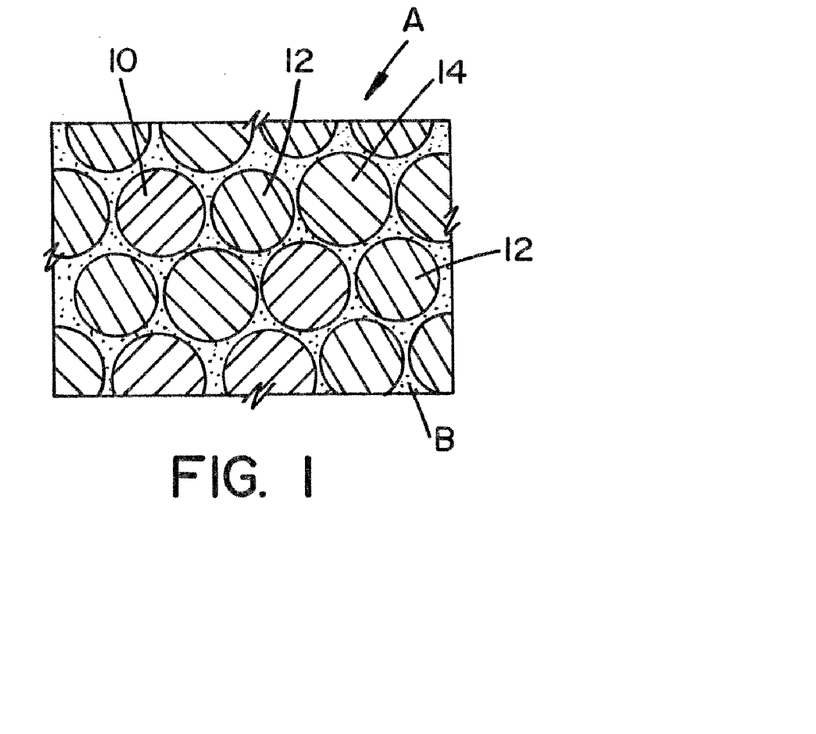
FIG. 1 is a schematic representation of the combined mixture of various minerals utilizing the binder of the present invention.
Figure 2:
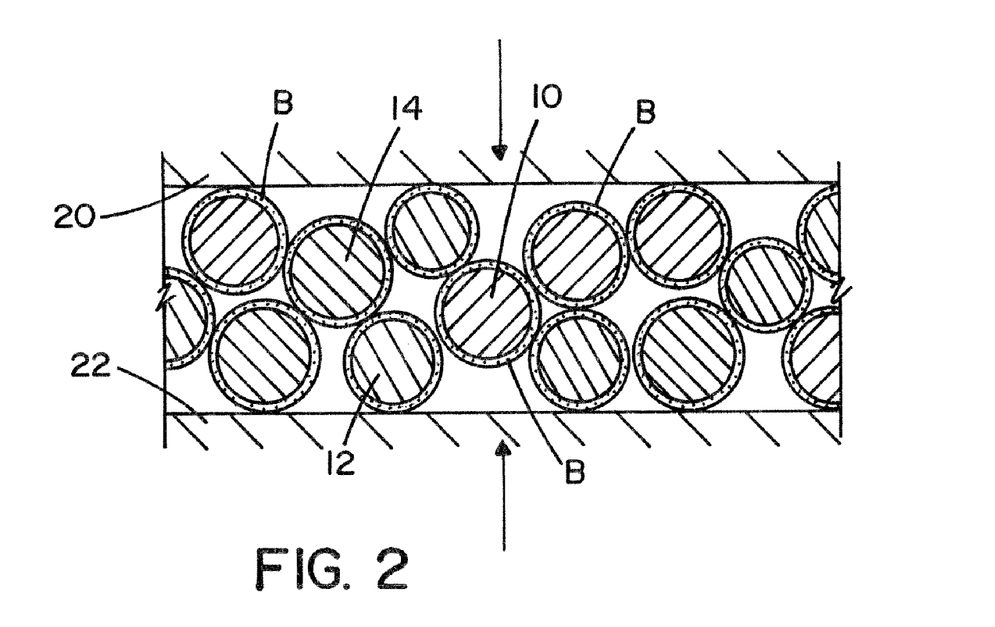
FIG. 2 is a schematic representation illustrating an operating characteristic of a collagen protein binder of the type to which the present invention is directed.

In FIG. 1 ceramic mixture A is a mixture of particles formed from several naturally occurring minerals, primarily clay 10. The other particles 12 and 14 are formed from diverse minerals, such as feldspar and/or nepheline syenite 12 and silica such as silica sand 14. All of these particles have a size of less than about 100 microns and are mixed together with binder B, which binder is the novel collagen protein binder constituting the present invention. A very small amount of binder essentially coats all of the particles 10-14, as schematically represented in FIG. 1. Consequently, each of the particles 10, 12, and 14 are essentially inorganic powder covered by an organic polymer B, which is the concept illustrated in FIG. 2. With the interplay and interaction between the mass of individual particles with the novel binder, it has been found that the particles can be pressed into a green body. This operation is indicated by movable wall or piston 20 toward fixed or movable wall 22 and schematically representing a shaped pressing mold. The interplay of the protein coated particles provide ease of pressing and creates a substantially higher strength than non-coated particle or particles using prior art binders for whiteware ceramic products. In summary, binder B coats the various inorganic mineral particles that have been combined and sized to produce whiteware ceramic products. This coating has a high flowability and plasticity to allow easy processing. This is a characteristic of the organic binder; however, by using the particular organic binder of the present invention, the body produced from the mixture shown in FIG. 1 has a substantially increased strength. Consequently, the advantages of a collagen protein binder are obtainable without decrease in the strength of the body. Indeed, the strength is increased as shown in Tables 1, 2, 3 and 4.

Figure 3:
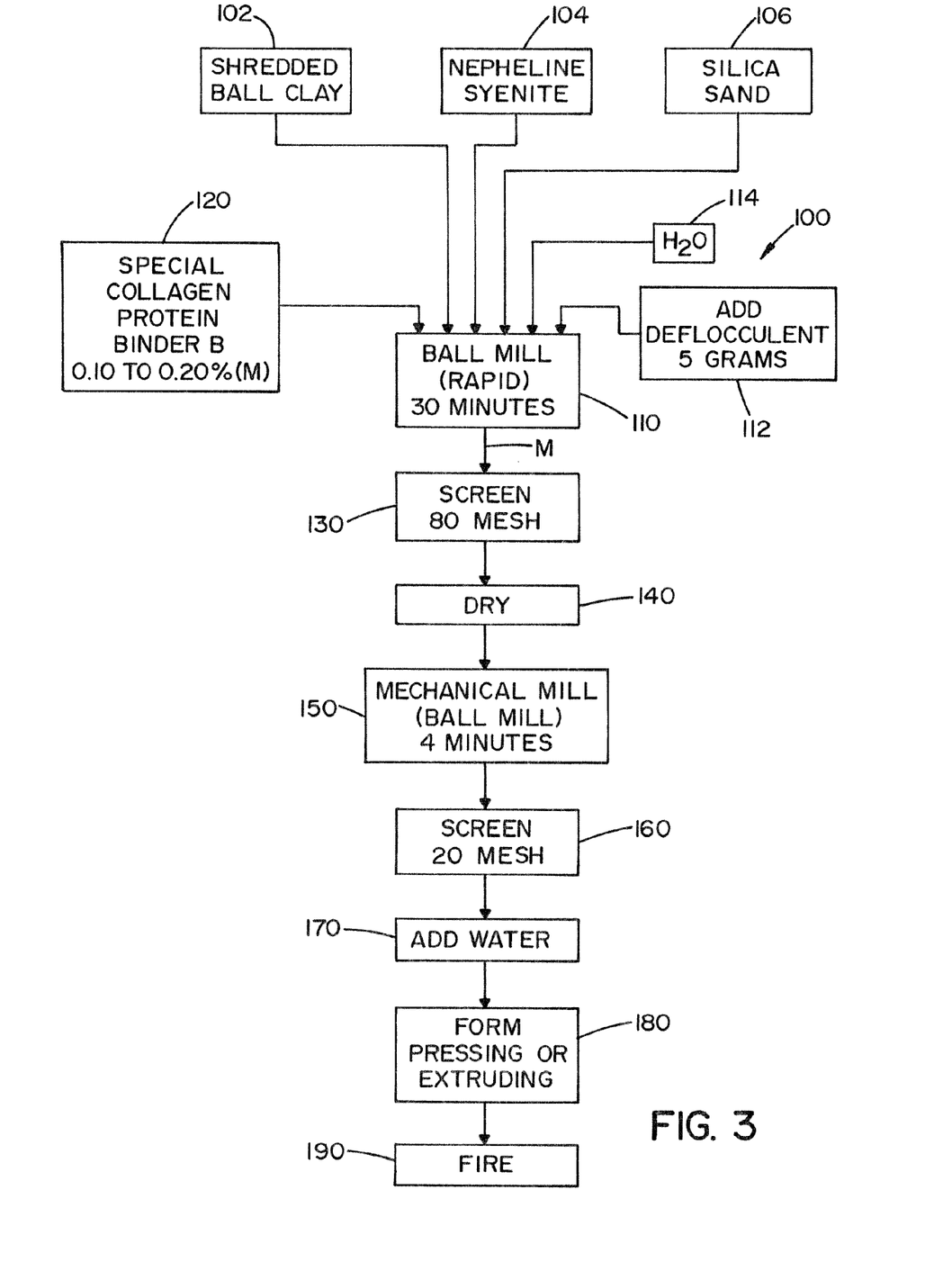
FIG. 3 is a block diagram disclosing a method for employing the novel collagen protein binder of the present invention.

Several methods are used for employing the special collagen protein binder of the present invention One method 100 is illustrated in FIG. 3 wherein mixture M is a combination of powders, such as clay 102, nepheline syenite 104 and silica sand 106. These three minerals are directed into a ball mill 110 in combination with a small amount of deflocculant 112 and sufficient water 114. The special collagen protein binder B of step 120 is directed to mill 110 and includes a sufficient volume to provide a loading of mixture M of preferably about 0.10-0.20% by weight of the mixture M produced by ball mill 110. However, the loading has been found to be appropriate in the range of 0.05 to 0.50% by dry weight. Ball mill 110 mechanically mixes the many input materials for a sufficient amount of time to obtain the desired particle size, for example, about 30 minutes. Mixture M is then directed through a standard series of process operations to produce a whiteware ceramic product. In method 100, the processing step involves a 80 mesh wet screening operation 130 followed by dryer 140 to produce a dry version of mixture M. The drying is normally for a prolonged time, often a complete night shift. Thereafter, dried mixture M is directed to the mechanical mill, preferably in the form of a ball mill, as indicated by operation 150. After about four minutes of the rapid mechanical milling of dried mixture M, it is passed through a grading screen 160 to produce a particle size that passes through a 20 mesh screen. Thereafter, a minor amount of water necessary for subsequent forming is directed to the dried mixture at operation 170. This makes a somewhat coherent mixture that can be pressed, extruded or otherwise formed into a green body, as indicated by a step 180. Thereafter, the body is fired into a whiteware ceramic product in a kiln 190. This procedure is somewhat standard in the ceramic whiteware industry. The improvement of method 100 is the use of a special collagen protein binder B as illustrated by operation or step 120.

Figure 3A:
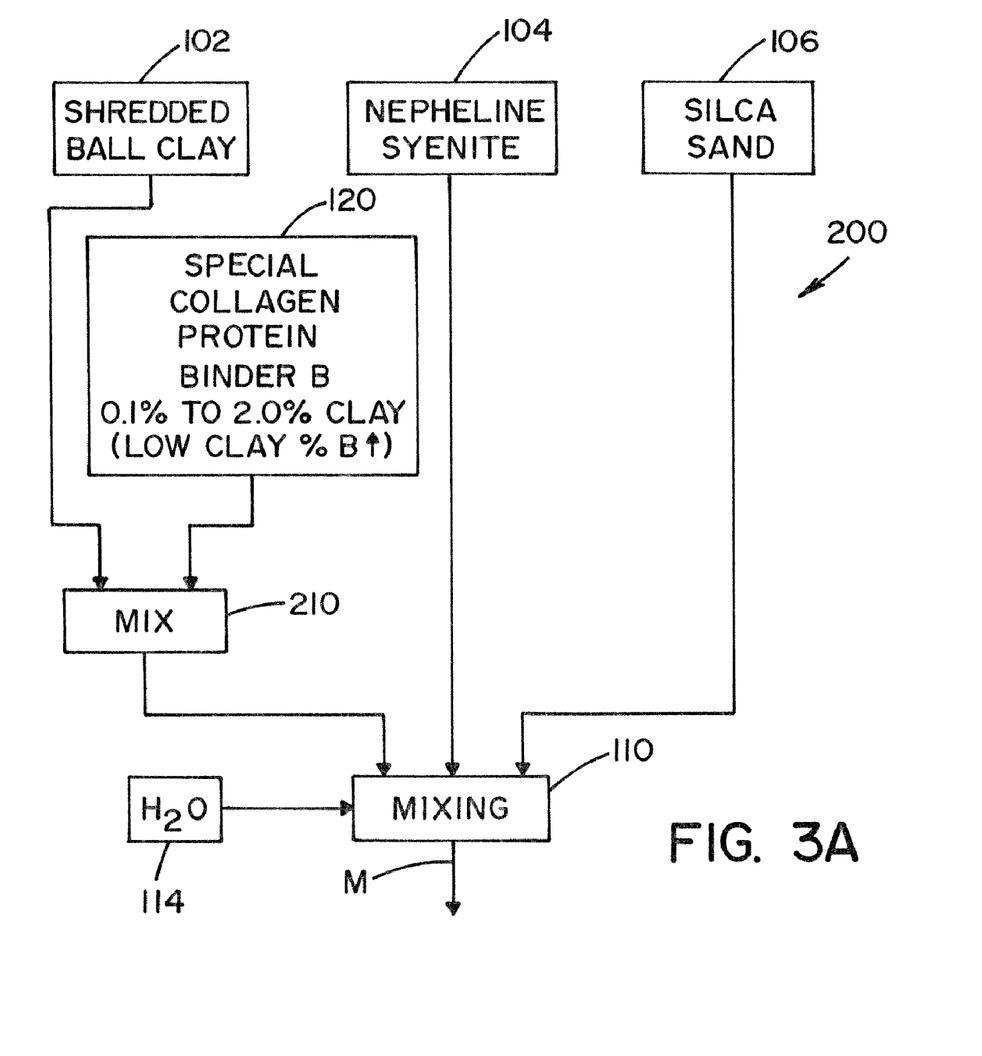

In method 100, binder B is added to mixture M at ball mill 110. In a preferred implementation of the present invention, method 100 of FIG. 3 is modified as indicated by method 200 shown in FIG. 3A. In this modification, clay 102 and special collagen protein binder B from step or operation 120 are combined by mixing operation 210. Thereafter, the combined dry ball clay particles and binder B are introduced into a ball mill 110 as used in method 100. In method 100, the loading of binder B is related primarily to mixture M and is in the general range of 0.10 to 0.20%. Of course, the amount of binder B could be predicated upon the amount of ball clay 102. When that occurs, the loading of the ball clay by binder B is generally in the range of 0.10-2.0% of the clay as indicated by method 200. The percentage of binder B used in the method 100 and 200 can be adjusted to produce the desired strength while controlling the amount of carbon in mixture M.

Figure 4:
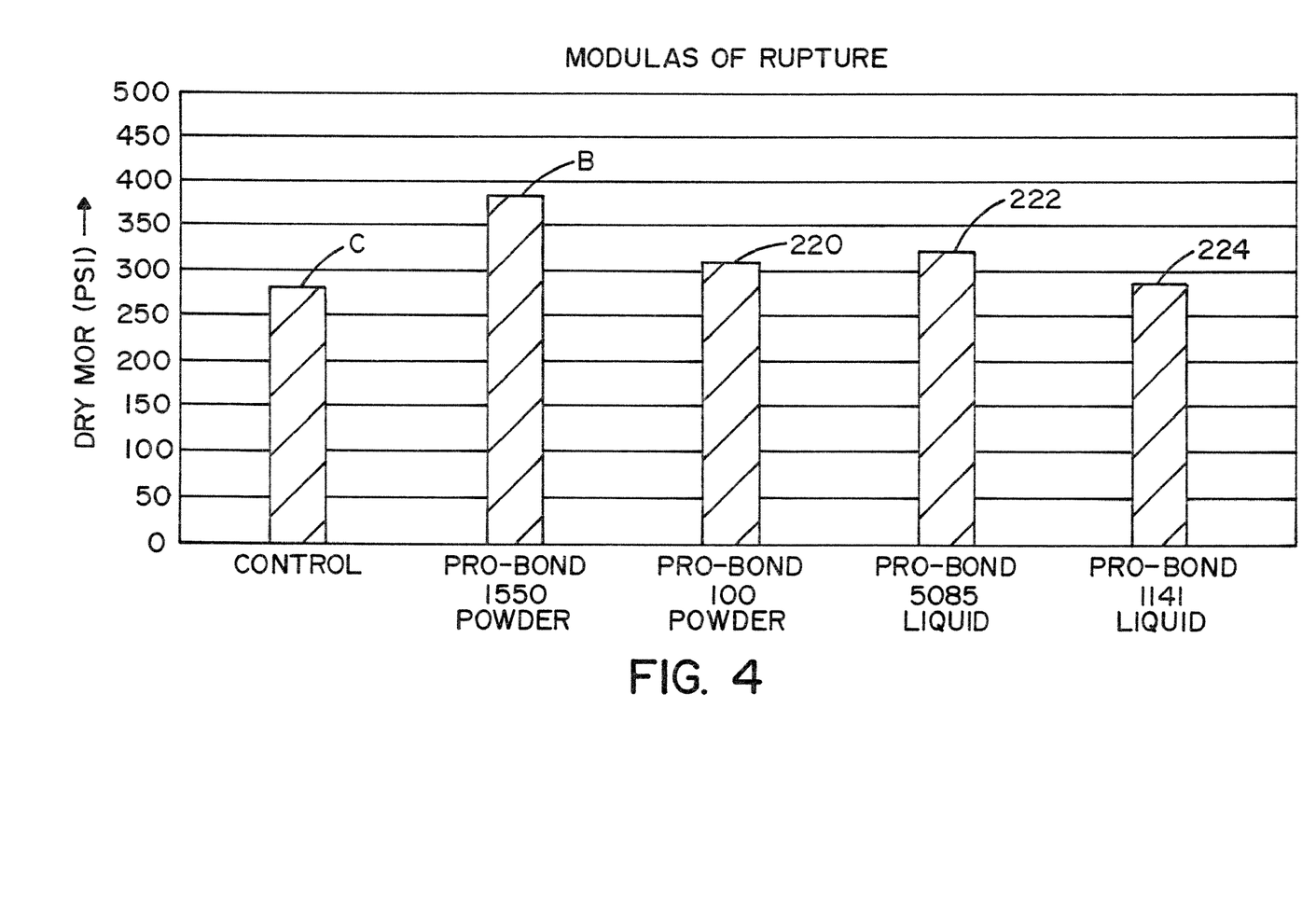

The data presented in Table 1 is schematically displayed in the bar graph of FIG. 4, wherein three collagen protein binders created bars 220, 222 and 224. These binders are shown to have limited impact on increasing the strength of the pre-fired whiteware ceramic product body, when compared to the control body C having no binder. Only the novel binder B drastically improves the dry modulus of rupture for the mixture. This substantial distinction of collagen protein binder B is the primary discovery that constitutes the invention of using binder B over other binders and even generic collagen protein bars. Binder B and the binder represented by bar 220 are both in powdered form. The binders resulting in the data of bars 222 and 224 are liquid versions of different collagen protein binders.

It is claimed:

1. The improvement in a mixture for forming into a body that is to be fired into a whiteware ceramic product, said improvement includes adding to said mixture a binder in the form of a combination of collagen protein and vegetable flour with an equivalent gram strength of at least about 30 grams and a protein content of about 30-50% of said binder, said binder having a particle size of less than about 20 mesh.

2. The improvement as defined in claim 1 wherein said vegetable flour is corn flour.

3. The improvement as defined in claim 2 wherein the moisture content of said binder is less than about 15% by weight of said binder.

4. The improvement as defined in claim 1 wherein said binder is in the range of 0.05 to 0.50 percent by weight of the total dry weight of said mixture.

5. The improvement as defined in claim 1 wherein said binder is in the range of 0.10 to 0.20 percent by weight of the total dry weight of said mixture.

6. The improvement as defined in claim 1 wherein said mixture includes 0-30 percent by weight of silica.

7. The improvement as defined in claim 1 wherein said mixture also includes nepheline syenite and/or feldspar.

8. The improvement as defined in claim 1 wherein said equivalent gram strength is in the general range of 30-80 grams.

9. The improvement in a mixture for forming into a body to be fired to make a whiteware ceramic product, said improvement comprises adding a binder in the form of a protein and a vegetable flour with an equivalent gram strength of at least about 30 grams and a protein content of 20-50% of said binder, said binder having a particle size of greater than 20 mesh said particle size of said binder is in the range of about 20-150 mesh.

10. The improvement as defined in claim 9 wherein said protein is selected from the class comprising collagen protein and vegetable protein.

11. The improvement as defined in claim 9 wherein said vegetable flour is selected from the class consisting of corn flour and starch.

12. The improvement as defined in claim 9 wherein said binder is in the range of 0.05 to 0.50 percent by weight of the total dry weight of said mixture.

13. The improvement as defined in claim 9 wherein said equivalent gram strength is in the general range of 30-80 grams.

14. The improvement in a mixture for forming into a body that is to be fired into a whiteware ceramic product, said improvement includes adding to said mixture a binder in the form of a protein with a protein content of 30-50% of said binder, said binder having a particle size of less than about 20 mesh and greater than about 200 mesh.

15. The improvement as defined in claim 14 wherein said binder is a combination of protein selected from the class consisting of collagen protein and vegetable protein and a vegetable flour selected from the class consisting of corn flour and starch.

16. The improvement as defined in claim 15 wherein said binder is in the range of 0.05 to 0.50 percent by weight of the total dry weight of said mixture.

17. The improvement as defined in claim 14 wherein said binder has an equivalent gram strength of at least about 30 grams.

18. The improvement as defined in claim 14 wherein said binder is in the range of 0.05 to 0.50 percent by weight of the total dry weight of said mixture.

19. The improvement as defined in claim 14 wherein the carbon content of the binder is less than 0.2% of the total mixture.

* * * * *